(12) United States Patent
Sampath et al.

(10) Patent No.: US 12,488,692 B2
(45) Date of Patent: Dec. 2, 2025

(54) SYSTEMS AND METHODS FOR IDENTIFYING CONTEXT FOR COCKPIT ALERTS

(71) Applicant: HONEYWELL INTERNATIONAL INC., Charlotte, NC (US)

(72) Inventors: Mahesh Kumar Sampath, Madurai (IN); Gobinathan Baladhandapani, Madurai (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 219 days.

(21) Appl. No.: 17/653,237

(22) Filed: Mar. 2, 2022

(65) Prior Publication Data

US 2023/0215279 A1  Jul. 6, 2023

(30) Foreign Application Priority Data

Jan. 5, 2022 (IN) .............................. 202211000566

(51) Int. Cl.
*G08G 5/21* (2025.01)
*B64D 43/00* (2006.01)
(Continued)

(52) U.S. Cl.
CPC .............. *G08G 5/21* (2025.01); *B64D 43/00* (2013.01); *G06F 3/1423* (2013.01);
(Continued)

(58) Field of Classification Search
CPC ........ G06F 40/30; G06F 40/40; G06F 40/274; G06F 40/103; G06F 40/45; G06F 17/217;
(Continued)

(56) References Cited

U.S. PATENT DOCUMENTS 9,620,020 B2    4/2017  Wang et al.
9,666,081 B2    5/2017  Gomez et al.
(Continued)

FOREIGN PATENT DOCUMENTS

CN    110276993 A  *  9/2019  ............... G08G 5/00
FR    2892536 A1  *  4/2007  ........... G06F 17/217

*Primary Examiner* — Yuri Kan
(74) *Attorney, Agent, or Firm* — Ingrassia Fisher and Lorenz, LLP (57) ABSTRACT

Systems, methods, and non-transitory computer readable media for identifying a cockpit alert context during an aircraft mission are provided. The system includes a controller configured to: store message content in a clearance look-up table for one or more clearance messages received from air traffic control (ATC) during the aircraft mission that contain cockpit data about which an avionic system in an aircraft may later sense and generate a cockpit system alert for display on a cockpit display device; monitor a plurality of avionic systems in the aircraft for a cockpit system alert; retrieve an ATC clearance message from the clearance look-up table that corresponds to a detected cockpit system alert when a cockpit system alert is detected; and signal an aircraft display device to display the ATC clearance message in a visually distinguishable manner that indicates that the displayed ATC clearance message relates to a detected cockpit system alert.

18 Claims, 6 Drawing Sheets

(51) Int. Cl.
*G06F 3/14* (2006.01)
*G06F 40/279* (2020.01)
*G06F 40/30* (2020.01)
*G10L 15/22* (2006.01)
*G10L 15/26* (2006.01)

(52) U.S. Cl.
CPC ............ *G06F 40/279* (2020.01); *G06F 40/30* (2020.01); *G10L 15/22* (2013.01); *G10L 15/26* (2013.01)

(58) Field of Classification Search
CPC .. G06F 40/114; G08G 5/0039; G08G 5/0021; G08G 5/723; G08G 5/00; G08G 5/727; G05B 23/0283; G06N 7/00
See application file for complete search history.

(56) References Cited

U.S. PATENT DOCUMENTS

| | | | |
|---|---|---|---|
| 9,666,178 | B2 | 5/2017 | Loubiere et al. |
| 10,732,788 | B1 | 8/2020 | Saptharishi et al. |
| 2006/0129553 | A1* | 6/2006 | Simonds ............... G06F 40/103 |
| 2010/0030401 | A1* | 2/2010 | Rogers ................. G08G 5/0039 |
| | | | 701/3 |
| 2011/0264437 | A1* | 10/2011 | Wise ....................... G06F 40/45 |
| | | | 704/3 |
| 2013/0027226 | A1 | 1/2013 | Cabos |
| 2015/0039551 | A1* | 2/2015 | Huet ......................... G06N 7/00 |
| | | | 706/52 |
| 2015/0081138 | A1 | 3/2015 | Lacko et al. |
| 2015/0089392 | A1 | 3/2015 | McGuffin et al. |
| 2015/0162001 | A1 | 6/2015 | Kar et al. |
| 2015/0217870 | A1 | 8/2015 | McCullough et al. |
| 2016/0155435 | A1 | 6/2016 | Mohideen |
| 2017/0076611 | A1 | 3/2017 | Shamasundar et al. |
| 2018/0005132 | A1* | 1/2018 | Singh .................. G05B 23/0283 |
| 2018/0225279 | A1* | 8/2018 | Cruz Huertas ......... G06F 40/30 |
| 2018/0314419 | A1* | 11/2018 | Kawahara ............. G06F 40/274 |
| 2019/0118964 | A1* | 4/2019 | Saptharishi ............. G06F 40/40 |
| 2021/0295710 | A1 | 9/2021 | Saptharishi et al. |
| 2021/0312927 | A1 | 10/2021 | Baladhandapani et al. |

* cited by examiner

SYSTEMS AND METHODS FOR IDENTIFYING CONTEXT FOR COCKPIT ALERTS

CROSS-REFERENCE TO RELATED APPLICATION

This application claims priority to India Provisional Patent Application No. 202211000566, filed Jan. 5, 2022, the entire content of which is incorporated by reference herein.

TECHNICAL FIELD

Embodiments of the subject matter described herein relate generally to aircraft systems for displaying ATC clearance messages. More particularly, embodiments of the subject matter relate to systems and methods for associating ATC clearance messages with cockpit alerts.

BACKGROUND

During flight various cockpit system alerts associated with various onboard aircraft systems may become active alerting the flight crew to a condition that needs to be considered during the mission. The cockpit system alerts may occur as a result of incorrectly entered data by a flight crew member, one or more failure conditions with an avionics system on the aircraft, or an external condition that can affect the mission, such as surrounding traffic or a prevailing weather condition. Fault isolation (e.g., through fault tree analysis or a checklist procedure) to determine the cause of the cockpit system alert can be time consuming and increase flight crew workload, and some alerts may require immediate attention to ensure safe flight operations. In some cases, air traffic control (ATC) clearance messages to the flight crew of the aircraft may provide advanced warning of conditions that may result in the occurrence of a cockpit alert or advisory message. Requiring a flight crew member to search through old clearance messages to find a reason for a cockpit alert can add to a flight crew member's workload during flight.

Hence, it is desirable to provide a system and method for providing context for cockpit alerts without requiring a flight crew member to search through old clearance messages to find a reason for a cockpit alert. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A flight deck system for identifying a cockpit alert context during an aircraft mission is disclosed. The flight deck system includes a controller configured to: store message content in a clearance look-up table for one or more clearance messages received from air traffic control (ATC) during the aircraft mission that contain cockpit data about which an avionics system in an aircraft may later sense and generate a cockpit system alert (e.g., cockpit alert or cockpit advisory) for display on a cockpit display device; monitor a plurality of avionics systems in the aircraft for a cockpit system alert; retrieve an ATC clearance message from the clearance look-up table that corresponds to a detected cockpit system alert when a cockpit system alert is detected; and signal an aircraft display device to display the ATC clearance message in a visually distinguishable manner that indicates that the displayed ATC clearance message relates to a detected cockpit system alert.

A method in a flight deck system for identifying a cockpit alert context during an aircraft mission is disclosed. The method includes: storing message content in a clearance look-up table for one or more clearance messages received from air traffic control (ATC) during the aircraft mission that contain cockpit data about which an avionics system in an aircraft may later sense and generate a cockpit system alert (e.g., cockpit alert or cockpit advisory) for display on a cockpit display device; monitoring a plurality of avionics systems in the aircraft for a cockpit system alert; retrieving an ATC clearance message from the clearance look-up table that corresponds to a detected cockpit system alert when a cockpit system alert is detected; and signaling an aircraft display device to display the ATC clearance message in a visually distinguishable manner that indicates that the displayed ATC clearance message relates to a detected cockpit system alert.

A non-transitory computer readable medium encoded with programming instructions configurable to cause a controller in an aircraft flight deck system to perform a method for identifying a cockpit alert context during an aircraft mission is disclosed. The method includes: storing message content in a clearance look-up table for one or more clearance messages received from air traffic control (ATC) during the aircraft mission that contain cockpit data about which an avionics system in an aircraft may later sense and generate a cockpit system alert (e.g., cockpit alert or cockpit advisory) for display on a cockpit display device; monitoring a plurality of avionics systems in the aircraft for a cockpit system alert; retrieving an ATC clearance message from the clearance look-up table that corresponds to a detected cockpit system alert when a cockpit system alert is detected; and signaling an aircraft display device to display the ATC clearance message in a visually distinguishable manner that indicates that the displayed ATC clearance message relates to a detected cockpit system alert.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical components and various processing steps. It should be appreciated that such functional and/or logical components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

During flight various cockpit alerts or advisory messages (both cockpit alerts and advisory messages are referred to herein as cockpit system alerts) associated with various onboard aircraft systems may become active alerting the flight crew to a condition that needs to be considered during the mission. The cockpit system alerts may occur as a result of incorrectly entered data by a flight crew member, one or more failure conditions with an avionics system on an aircraft, or an external condition that can affect a mission, such as surrounding traffic or a prevailing weather condition. Fault isolation (e.g., through fault tree analysis or a checklist procedure) to determine the cause of a cockpit system alert can be time consuming and increase flight crew workload, and some alerts may require immediate attention to ensure safe flight operations.

In some cases, air traffic control (ATC) clearance messages to the flight crew of an aircraft may provide advanced warning of conditions that may result in the occurrence of a cockpit alert or advisory message. The subject matter described herein discloses apparatus, systems, techniques, and articles for associating received ATC clearance messages with cockpit system alerts thereby providing context for the cockpit alerts or advisory messages. As a result of associating an ATC clearance message with a cockpit alert or advisory message, a flight crew member can reference the associated ATC clearance message when a cockpit system alert occurs to find the reason behind the occurrence of the cockpit system alert without having to engage in time consuming fault isolation. The reduced flight crew workload that can be achieved using the disclosed apparatus, systems, techniques, and articles can be extremely helpful and may help enable single pilot operation for many operating scenarios.

As an example, ATC is responsible for providing cautionary wake-turbulence information through the VHF Radios to assist flight crew members (e.g., pilots) prior to the flight crew assuming visual responsibility for avoidance. ATC will issue wake-turbulence cautionary advisories and the position, altitude if known, and direction of flight based on aircraft wake turbulence categories. However, if a pilot accepts a clearance to visually follow a preceding aircraft, the pilot accepts responsibility for both separation and wake turbulence avoidance. The controllers will also provide a Wake Turbulence Cautionary Advisory to pilots of visual flight rules (VFR) aircraft, with whom they are in communication and on whom, in the controller's opinion, wake turbulence may have an adverse effect. This advisory includes the position, altitude, and direction of flight of larger aircraft followed by the phrase "CAUTION—WAKE TURBULENCE." After issuing the caution for wake turbulence, the air traffic controllers generally do not provide additional information to the following aircraft.

Considering the above operational scenario with respect to wake turbulence, if a WAKE alert is triggered on a cockpit system, the flight crew needs to understand the context of the alert, such as the aircraft category causing such alert, minimum safe in-trail distance, intentions of leading aircraft, etc. Such information would already have been provided in the by ATC in an ATC clearance message, such as in the following example:

SOUTHWEST TWO FIFTY EIGHT SAN FRANCISCO TOWER CAUTION WAKE TURBULENCE BOEING SEVEN THREE SEVEN HOLDING IN POSITION WIND ONE NINE ZERO AT ONE TWO RUNWAY TWO EIGHT RIGHT CLEARED TO LAND Upon the flight crew seeing the WAKE alert on a cockpit display, the flight crew may be interested in more information such as details regarding the aircraft that is causing the wake and in identifying a safe distance/speed for maintaining required spacing to avoid a catastrophic event such as temporary loss of control or to ensure passenger comfort. The disclosed apparatus, systems, techniques, and articles can associate the prior ATC clearance message with the WAKE alert to provide the flight crew with more information regarding the conditions leading to the WAKE alert.

In another example, if a TRAFFIC ALERT is triggered in TCAS (traffic collision avoidance system) or a TRAFFIC message is displayed on an avionics display, the flight crew may be interested in more information regarding why the TRAFFIC ALERT was triggered. In this example, a prior ATC clearance message was provided that is related to the TRAFFIC ALERT:

ECHO ROMEO TRAFFIC IS MOVING TO YOUR TWELVE TO ONE O'CLOCK IN ONE FIVE MILES GULFSTREAM SIX AT FIVE THOUSAND CLIMBING TO SEVEN THOUSAND The disclosed apparatus, systems, techniques, and articles can associate the prior ATC clearance message with the TRAFFIC ALERT to provide the flight crew with more information regarding the conditions leading to the TRAFFIC ALERT.

Several different cockpit systems may trigger alerts. Some alerts are routed to the CAS (Crew Alerting System). Some alerts, such as FMS triggered alerts, are displayed in the MCDU Scratchpad. Some other alerts are displayed in an INAV window depending on the criticality of the alert. The disclosed apparatus, systems, techniques, and articles can associate prior ATC clearance message with various alerts, regardless of the source and where displayed, to provide the flight crew with more information regarding the conditions leading to the alert.

The disclosed apparatus, systems, techniques, and articles can associate ATC clearance messages with associated cockpit system alerts to reduce the amount of fault isolation that must be conducted when a cockpit system alert is experienced in an aircraft cockpit during a mission. The disclosed apparatus, systems, techniques, and articles can integrate cockpit alerts with relevant VHF communications to provide better situational awareness to the flight crew. The disclosed apparatus, systems, techniques, and articles can be integrated with a transcription system used in an aircraft to transcribe ATC clearance messages received in the aircraft.

A transcription system can transcribe over-the-air voice communications between an air traffic controller (ATC) and a flight crew member such as a pilot. Over-the-air communications may include both ownship communications and traffic communications. Ownship communications may include commands from ATC for an ownship pilot, and may also include traffic alerts. Traffic communication may include commands for traffic pilots. Knowledge of these commands can provide situational awareness to an ownship pilot.

The disclosed apparatus, systems, techniques, and articles can analyze received ATC clearance messages, determine which are relevant to potential cockpit system alerts, associate the ATC clearance message that is most relevant to an active cockpit system alert, and cause the associated ATC clearance message to be displayed in a dedicated location when the cockpit system alert becomes active, which can help flight crew members with efficient decision making and smooth handling of the condition that necessitated the cockpit system alert. The disclosed apparatus, systems, techniques, and articles can reduce heads down time of a pilot and can result in cognitive workload reduction for a pilot.

Figure 1:
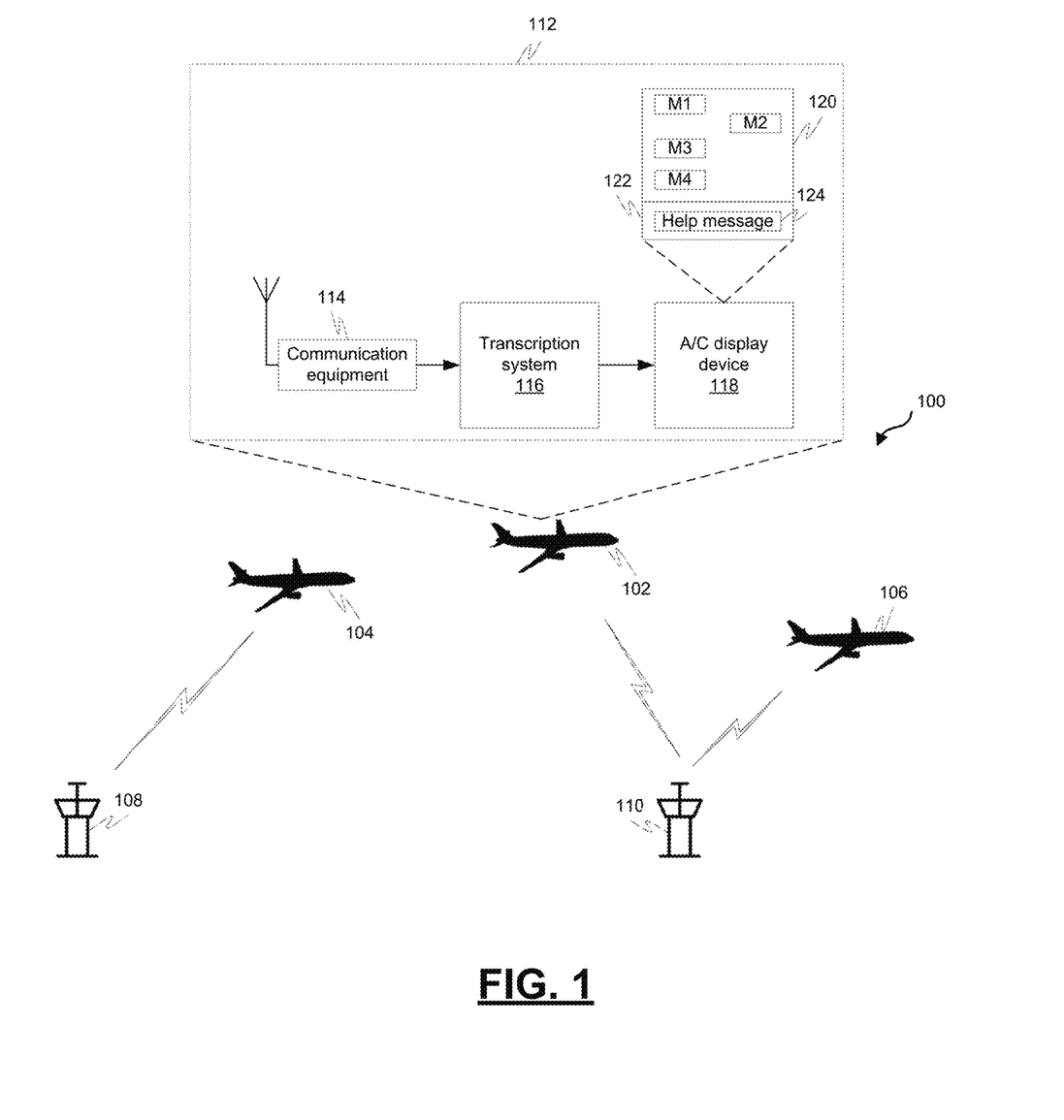
FIG. 1 is a block diagram depicting an example flight environment such as one around a busy aerodrome, in accordance with some embodiments.

FIG. 1 is a block diagram depicting an example flight environment 100 such as one around a busy aerodrome. The example environment 100 includes a plurality of aerial vehicles (ownship aircraft 102 and traffic aircraft 104, 106 in this example), but could include a variety of types of aerial vehicles such as helicopters, UAVs (unmanned aerial vehicles), and others. The example environment 100 also includes a plurality of flight operation centers (FOCs) (e.g., air traffic control towers 108, 110) containing control personnel such as air traffic controllers (ATC) for directing ground and air traffic in the vicinity of the aerodrome.

The example ownship aircraft 102 includes avionics equipment 112 that receives the ongoing communications between the aerial vehicles (e.g., 102, 104, 106) and ATC (e.g., via towers 108, 110) using communication equipment 114, and presents the ongoing communications as a continuous stream of audio to a transcription system 116. The transcription system 116 decodes the continuous stream of audio, generates formatted text from the decoded continuous stream of audio, and signals an aircraft (A/C) display device 118 to display the generated formatted text for viewing by the flight crew onboard the ownship aircraft 102. The aircraft display device 118 may be one of many types of graphical display units onboard an aircraft such as a navigation display, a PFD (primary flight display), a PED (personal electronic device), an EFB (electronic flight bag), HUD (heads up display), HDD (heads down display), and others. The display of the formatted text may be made via a graphical display page 120 that displays each generated textual message (M1, M2, M3, M4, . . . ) in a manner that visually identifies which messages are directed to the ownship aircraft and which messages are directed to ATC.

The ownship aircraft 102 may also include a flight deck system (e.g., as part of the transcription system 116 or separate from the transcription system 116) for associating ATC clearance messages with cockpit alerts and causing an appropriate ATC clearance message (e.g., Help message 124) to be displayed at an appropriate time in a specific location 122 (e.g., on the graphical display page 120) when a cockpit alert occurs. The display of the help message 124 can provide context for the cockpit alert. The displayed help message 124 may provide a reason why the cockpit alert occurred.

Figure 2:
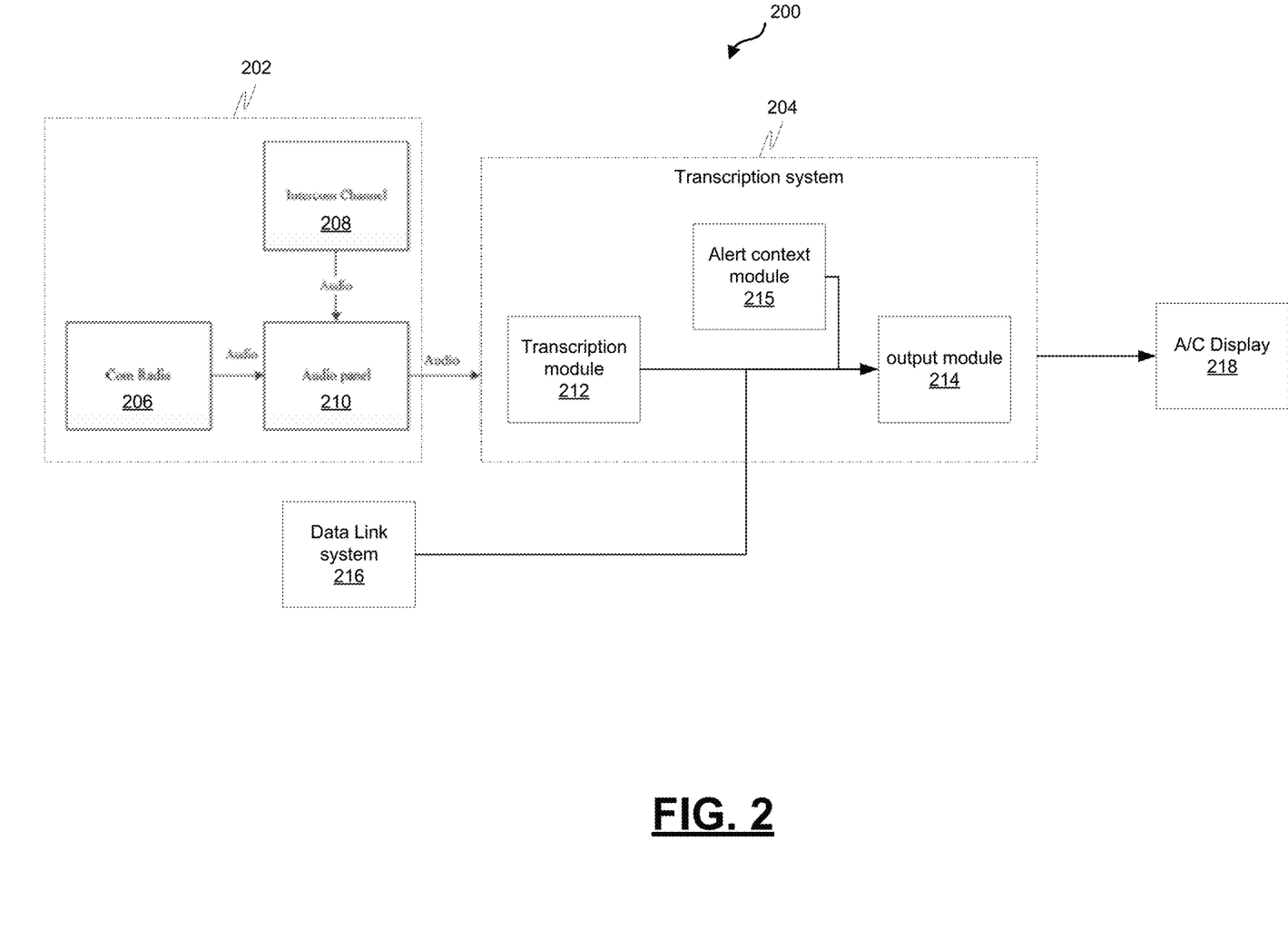
FIG. 2 is a block diagram depicting example avionics equipment, in accordance with some embodiments.

FIG. 2 is a block diagram depicting example avionics equipment 200. The example avionics equipment 200 includes communication equipment 202 and an example transcription system 204 for receiving ongoing over-the-air communications and generating formatted text from the over-the-air communications for display onboard an aerial vehicle. The example communication equipment 202 includes a Com radio 206 (such as that known in the art) and an intercom channel 208 (such as that known in the art) for receiving over-the-air communications between various aerial vehicles (ownship and traffic aerial vehicles) and ATC. The example communication equipment 202 also includes an audio panel 210 (such as that known in the art) for accumulating the over-the-air communications from various sources and outputting the audio from the over-the-air communications.

The example transcription system 204 is configured to receive audio communications from or directed to a flight operating center (FOC) (e.g., an ATC center or some other FOC) via the communication equipment 202 (e.g., via audio panel 210), extract message content from the received audio communications, generate formatted text from the extracted message content, and display the formatted text from the received voice communications onboard the aerial vehicle. The example transcription system 204 is also configured to receive data link communications (DLC) (e.g., CPDLC (controller pilot data link communication)) from or to an FOC (such as ATC) via a data link system 216, extract message content from the DLC, generate formatted text from the extracted message content, and display the formatted text from the received DLC communications onboard the aerial vehicle. The example transcription system 204 includes a transcription module 212 for extracting message content from the received audio communications and the DLC, and an output module 214 for generating formatted text from the extracted message content, generating graphics for displaying the formatted text, and signaling an aircraft display 218 to display the generated graphics onboard the aerial vehicle. The example transcription system 204 further includes an alert context module 215 for associating received ATC clearance messages with cockpit system alerts thereby providing context for the cockpit alerts or advisory messages. The example alert context module 215 can analyze received ATC clearance messages, determine which are relevant to potential cockpit system alerts, associate the ATC clearance message that is most relevant to an active cockpit system alert, and cause the associated ATC clearance message to be displayed (e.g., via the output module 214) in a dedicated location (e.g., on the A/C display 218) when the cockpit system alert becomes active.

Each of the transcription module 212, the output module 214, and the alert context module 215 is implemented by a processing component such as a controller (e.g., the same or separate controllers). The processing component includes at least one processor and a computer-readable storage device or media encoded with programming instructions for configuring the processing component. The processor may be any custom-made or commercially available processor, a central processing unit (CPU), a graphics processing unit (GPU), an application specific integrated circuit (ASIC), a field programmable gate array (FPGA), an auxiliary processor among several processors associated with the processing component, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the processing component.

The example transcription module 212 is configured to retrieve message content from a plurality of received messages. The plurality of received messages may include a plurality of CPDLC messages and a plurality of voice messages. The example transcription module 212 is configured to transcribe message content from the plurality of received voice messages to text. The example transcription module 212 is also configured to extract message content from the plurality of received CPDLC messages as text.

The example transcription module 212 is configured to decode the audio from the voice messages using speech recognition techniques to convert the audio into text. The speech recognition techniques may be implemented using machine learning techniques such as deep neural networks, statistical techniques, rule-based systems, and others. The example transcription module 212 may use various techniques such as NLP to convert the text from the audio and/or DLC to formatted text.

The example output module 214 is configured to generate a graphical message element for each of the plurality of received messages that includes a section for displaying a textual representation of the message content for a corresponding received message.

The example alert context module 215 is configured to analyze message content retrieved by the example transcription module 212 for association with a potential future cockpit system alert, and store message content in a clearance look-up table for one or more clearance messages received from ATC that contain cockpit data about which an avionics system in the aerial vehicle may later sense and generate a cockpit system alert (e.g., a cockpit alert or cockpit advisory) for display on the A/C display 218. The example alert context module 215 is further configured to monitor a plurality of avionics systems in the aerial vehicle for a cockpit system alert and retrieve an ATC clearance message from the clearance look-up table that corresponds to a detected cockpit system alert when a cockpit system alert is detected. The example alert context module 215 is further configured to signal the A/C display 218 to display the retrieved ATC clearance message in a visually distinguishable manner that indicates that the displayed ATC clearance message relates to a detected cockpit system alert.

Table 1 shown below provides an example data structure for data that may be stored in a clearance look-up table for one or more clearance messages received from ATC that contain cockpit data about which an avionics system in the aerial vehicle may later sense and generate a cockpit system alert.

TABLE 1

Conversation Look Up table

| Clearance ID | Clearance | Data | Context | Sub Systems |
|---|---|---|---|---|
| 1 | ECHO ROMEO TRAFFIC IS MOVING TO YOUR TWELVE TO ONE O'CLOCK IN ONE FIVE MILES GULFSTREAM SIX AT FIVE THOUSAND CLIMBING TO SEVEN THOUSAND | Traffic | Detect and Avoidance, Enroute | PFD, TCAS |
| 2 | CLEARED FOR ILS27L AND INTERCEPT FROM NORTH | Approach | Approach, Landing | FMS, NAV RADIO |
| 3 | PHOENIX ALTIMETER TWO NINER EIGHT EIGHT | Barometer setting | Approach | FMS, ADS |
| 4 | SOUTHWEST TWO FIFTY-EIGHT SAN FRANCISCO TOWER CAUTION WAKE TURBULENCE BOEING SEVEN THREE SEVEN HOLDING IN POSITION WIND ONE NINE ZERO AT ONE TWO RUNWAY TWO EIGHT RIGHT CLEARED TO LAND | Aircraft Wake turbulence category | Wake | EGPWS, PFD |

In this example, for each of a plurality of ATC clearance messages that has cockpit data, the data structure includes a unique identifier in column 1, clearance data in column 2, a category for the clearance message in column 3, a context for the clearance message in column 4, and an associated sub system(s) for the ATC clearance message in column 5 The clearance look-up table has information for mapping the clearance data with a cockpit system alert.

Figure 3:
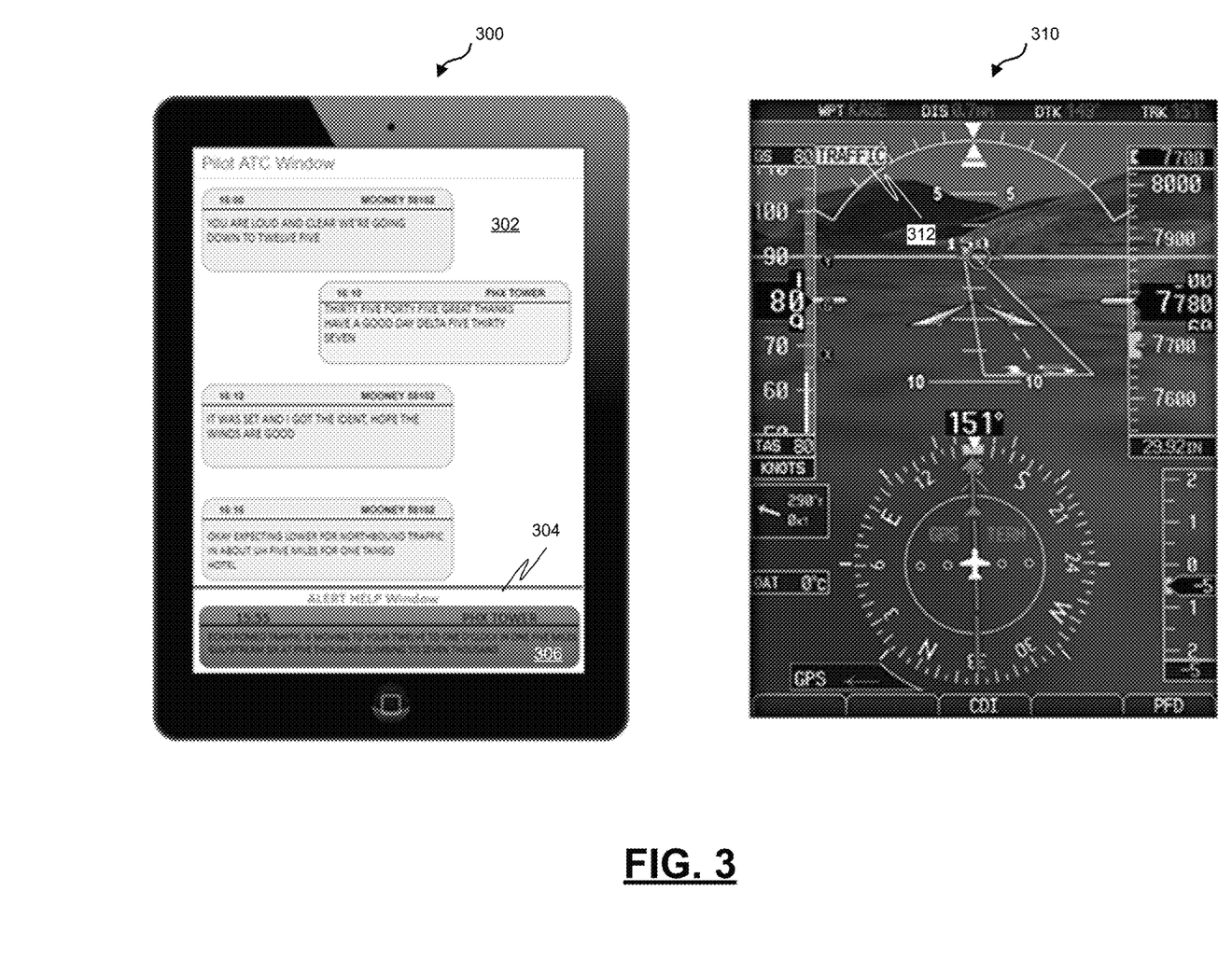
FIG. 3 is a diagram depicting an example display primary flight display that illustrates the display of a cockpit system alert and an example graphical display page that has a first window for displaying generated textual messages and a second window for displaying an ATC clearance message that is associated with the cockpit system alert, in accordance with some embodiments.

FIG. 3 is a diagram depicting an example graphical display page 300 that has a first window 302 for displaying generated textual messages (M1, M2, M3, M4, . . . ) in a manner that visually identifies which messages are directed to an ownship aircraft and which messages are directed to ATC and a second window—alert help window 304—for displaying an ATC clearance message 306 that is associated with an active cockpit system alert. Also, depicted in FIG. 3 is an example display primary flight display 310 that indicates that a cockpit system alert, traffic alert 312, has been detected and is active. The ATC clearance message 306 displayed in the second window 304 can provide context for the Traffic alert 312. Thus, a flight crew member, such as a pilot, upon viewing the Traffic alert 312 can turn his attention to the alert help window 304 to gain context regarding why the Traffic alert 312 is active without having to engage in time consuming fault detection.

Figure 4:
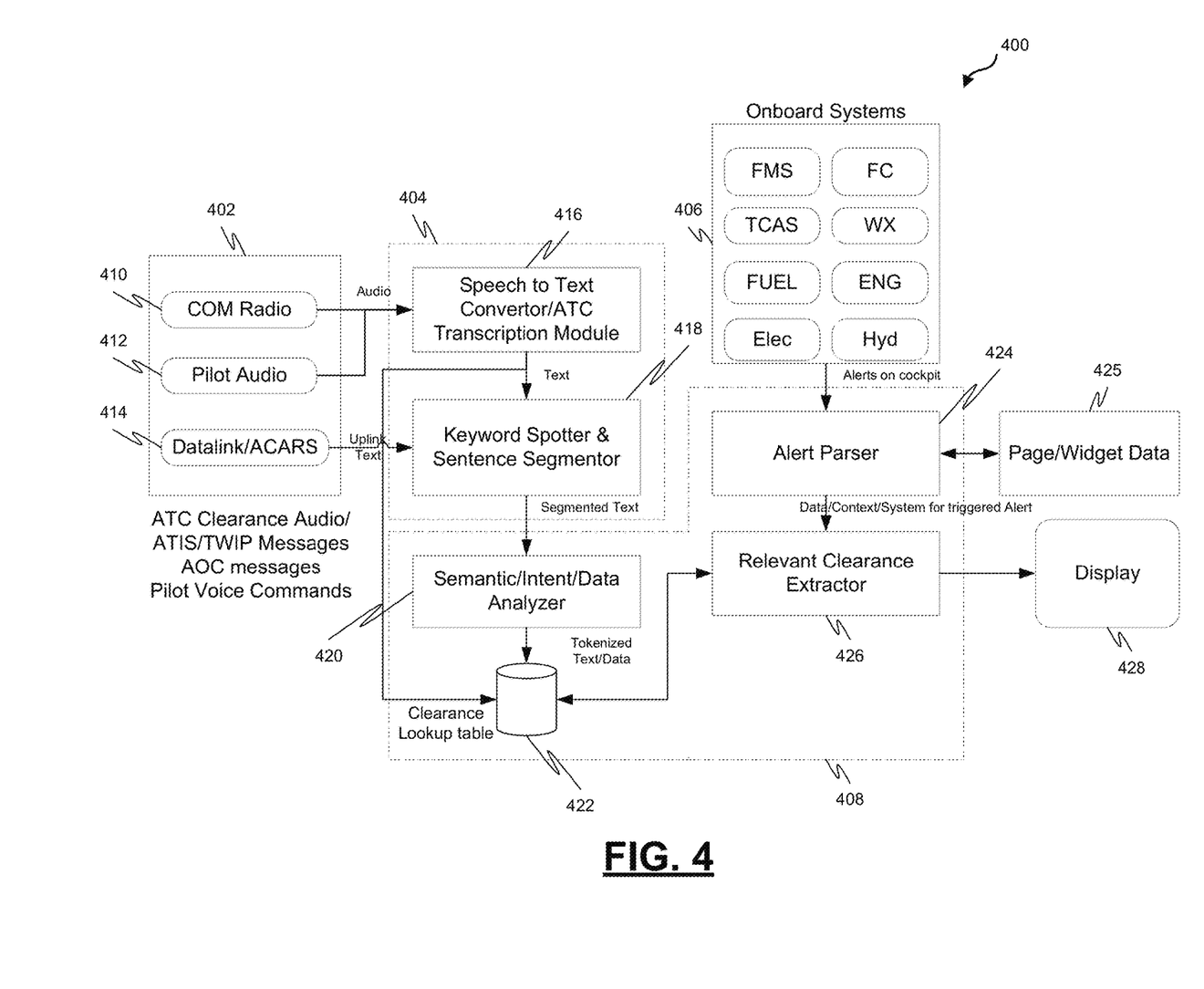
FIG. 4 is a system block diagram of depicting example avionics equipment that includes an example alert context module, in accordance with some embodiments.

FIG. 4 is a system block diagram of depicting example avionics equipment 400 that includes an example alert context module. The example avionics equipment 400 include communication equipment 402, a transcription system 404, and onboard systems 406, and an example alert context module 408. The example communication equipment 402 includes a COM radio 410 for receiving over-the-air communications from ATC and traffic aircraft, a Pilot audio system 412 for receiving flight crew member communication, and a datalink system 414 for receiving over-the-air datalink communications. The example transcription system 404 includes a speech to text convertor/ATC transcription module 416 for converting speech to text and a keyword spotter and sentence segmentor 418 for deriving segmented text from the output of the speech to text converter 416 and segmented text from uplink text from the datalink system 414. The example onboard systems 406 include a flight management system (FMS), a flight control (FC) system, a traffic alert and collision avoidance system (TCAS), a weather (WX) system, a Fuel system, an engine (Eng) system, an electrical (Elec) system, and a hydraulics (Hyd) system, among others.

The example alert context module 408 includes a semantic/intent/data analyzer 420 for analyzing segmented text from the transcription system 404 and for identifying, from the segmented text for each of the plurality of ATC clearance messages, whether cockpit data is included about which an onboard system 406 may later sense and generate a cockpit system alert for display on an display device, a context for included cockpit data, and each onboard system within the aircraft that is associated with the cockpit data. The example semantic/intent/data analyzer 420 is also configured to store message content, for each of the plurality of ATC clearance messages that has cockpit data, the unique identifier, clearance data, context, and associated onboard system for the ATC clearance message in a clearance look-up table 422 in a datastore on the aerial vehicle. The clearance look-up table 422 is configured to map clearance data with a cockpit system alert.

The example alert context module 408 further includes an alert parser 424 and a relevant clearance extractor 426. The example alert parser 424 is configured to monitor the onboard systems 406 for cockpit system alerts generated by the onboard systems 406. The example alert parser 424 is also configured to monitor page/widget data 425 from various cockpit displays for cockpit system alerts.

The example relevant clearance extractor 426 is configured to retrieve alerts identified by the example alert parser 424 and match them up with corresponding ATC clearance messages stored in the clearance look-up table 422 to the extent any corresponding ATC clearance message exists. The example clearance extractor 426 is figured to cause the latest or most relevant corresponding ATC clearance message to be displayed in a visually distinguishable manner on an aircraft display 428.

Figure 5:
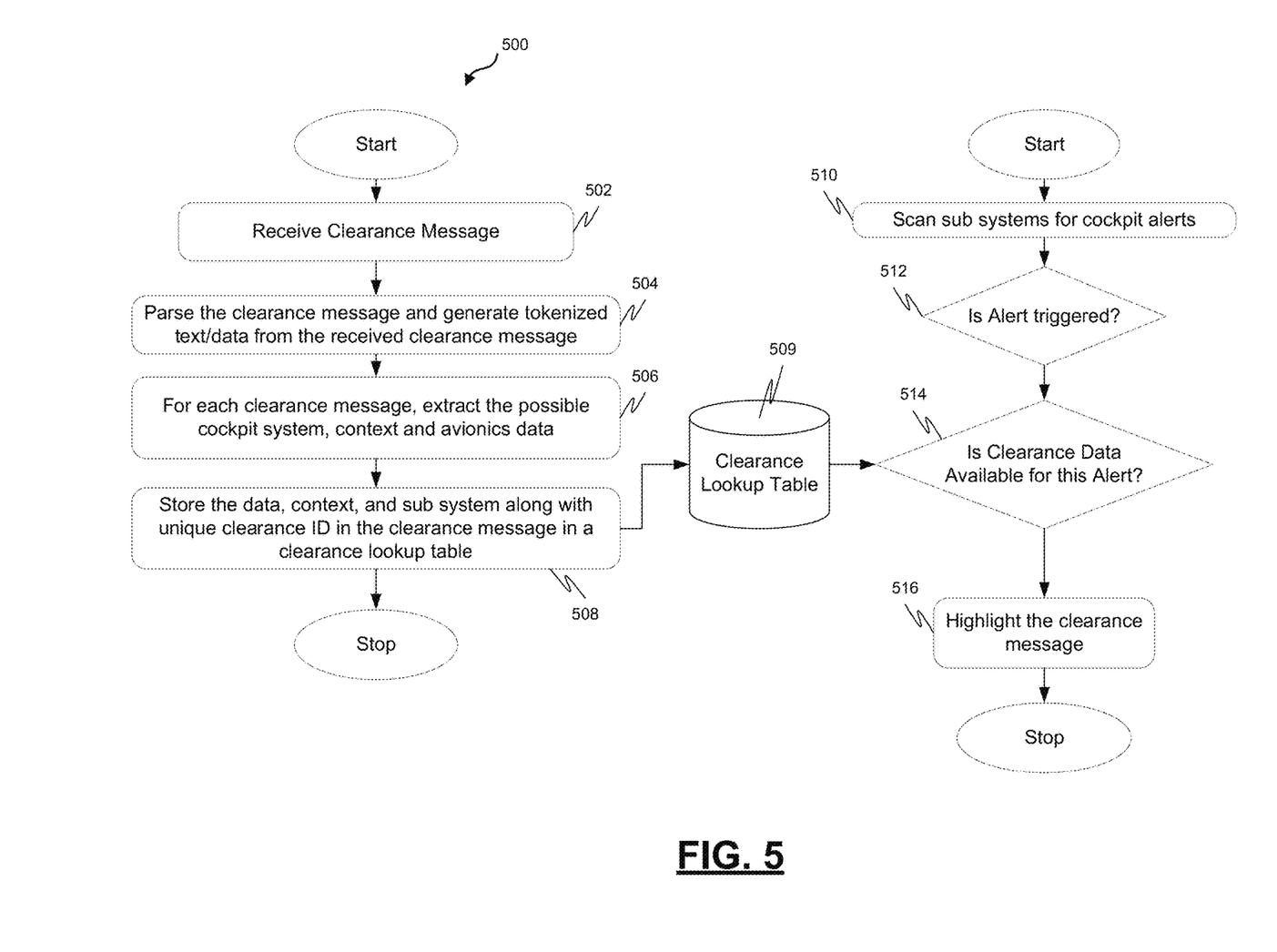
FIG. 5 is a process flow chart depicting an example process in an example alert context module for identifying a cockpit alert context during an aircraft mission, in accordance with some embodiments.

FIG. 5 is a process flow chart depicting an example process 500 in an example alert context module (e.g., alert context module 215 or 408) for identifying a cockpit alert context during an aircraft mission. The order of operation within the process 500 is not limited to the sequential execution as illustrated in the figure but may be performed in one or more varying orders as applicable and in accordance with the present disclosure.

The example process 500 includes receiving a clearance message (operation 502) and parsing the clearance message and generating tokenized text/data from the received clearance message (operation 504).

The example process 500 includes, for each clearance message, extracting the possible cockpit system, context, and avionics data (operation 506) and storing the data, context, and sub system (e.g., cockpit system) along with unique clearance ID in the clearance message in a clearance look-up table 509 (operation 508).

The example process 500 includes, scanning sub systems for cockpit alerts (operation 510) and determining if an alert is triggered (decision 512). When an alert has been triggered, the example process 500 includes determining if clearance data is available for this cockpit alert in the clearance look-up table (decision 514). When clearance data is available for this alert, the example process 500 includes displaying and highlighting the clearance message on a cockpit display operation 516).

Figure 6:
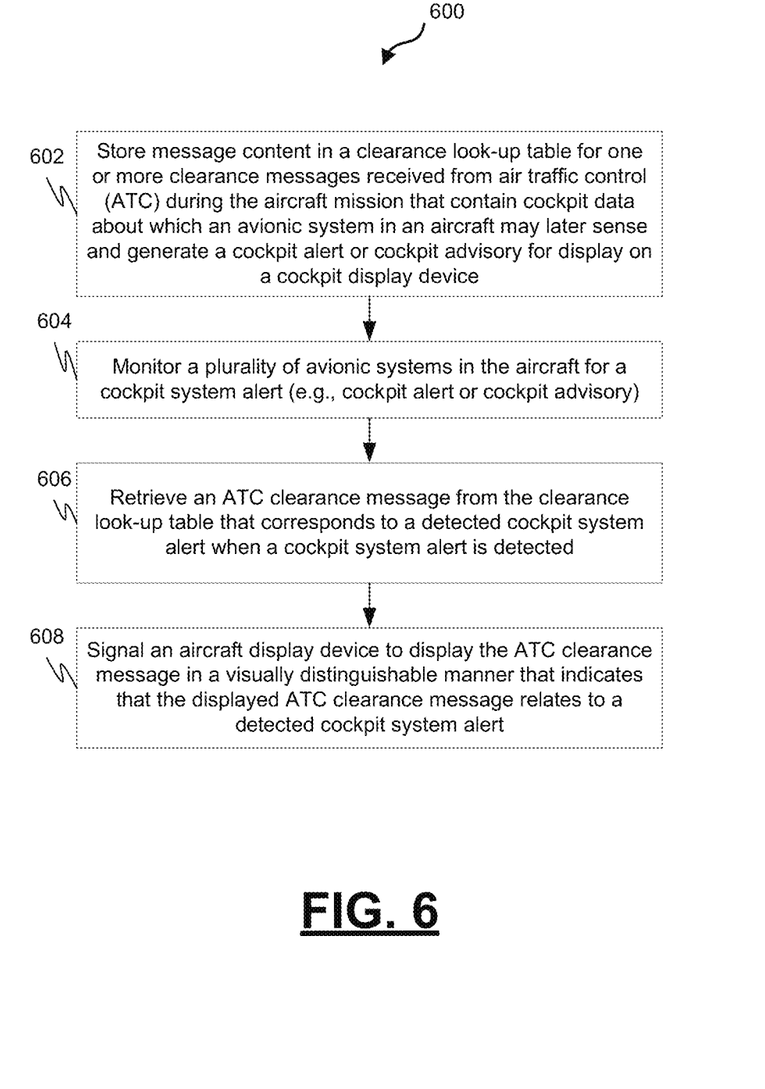
FIG. 6 is a process flow chart depicting another example process in an example alert context module for identifying a cockpit alert context during an aircraft mission, in accordance with some embodiments, in accordance with some embodiments.

FIG. 6 is a process flow chart depicting an example process 600 in an example alert context module (e.g., alert context module 215 or 408) for identifying a cockpit alert context during an aircraft mission. The order of operation within the process 600 is not limited to the sequential execution as illustrated in the figure but may be performed in one or more varying orders as applicable and in accordance with the present disclosure.

The example process 600 includes storing message content in a clearance look-up table for one or more clearance messages received from air traffic control (ATC) during an aircraft mission that contain cockpit data about which an avionics system in an aircraft may later sense and generate a cockpit alert or cockpit advisory for display on a cockpit display device (operation 602) and includes monitoring a plurality of avionics systems in the aircraft for a cockpit system alert (e.g., cockpit alert or cockpit advisory) (operation 604). Storing message content may comprise identifying one or more ATC clearance messages that contain cockpit data; and storing message content from the identified one or more ATC clearance messages in the clearance look-up table. Identifying one or more ATC clearance messages that contain cockpit data may comprise analyzing a plurality of ATC clearance messages, wherein each of the plurality of ATC clearance messages has a unique identifier; retrieving segmented text from the analyzed ATC clearance messages; and identifying, from the segmented text for each of the plurality of ATC clearance messages, whether cockpit data is included, a context for included cockpit data, and each sub system within the aircraft that is associated with the cockpit data. Storing message content may comprise storing, for each of the plurality of ATC clearance messages that has cockpit data, the unique identifier, clearance data, context, and associated sub system for the ATC clearance message in the clearance look-up table, wherein the clearance look-up table maps the clearance data with a cockpit system alert.

The example process 600 includes retrieving an ATC clearance message from the clearance look-up table that corresponds to a detected cockpit system alert when a cockpit system alert is detected (operation 606). Retrieving an ATC clearance message from the clearance look-up table may comprise searching the clearance look-up table, when a cockpit system alert is detected, for a corresponding ATC clearance message using context and associated sub system information for the cockpit system alert; and identifying one or more corresponding ATC clearance messages based on the search. Retrieving an ATC clearance message from the clearance look-up table may comprise identifying the unique identifier for a most recent one of the one or more corresponding ATC clearance messages identified based on the search; and retrieving the ATC clearance message corresponding to the unique identifier.

The example process 600 includes signaling an aircraft display device to display the ATC clearance message in a visually distinguishable manner that indicates that the displayed ATC clearance message relates to a detected cockpit system alert (operation 608). Signaling the aircraft display device to display the ATC clearance message in a visually distinguishable manner may comprise signaling the aircraft display device to display the ATC clearance message corresponding to the unique identifier in a visually distinguishable manner Signaling the aircraft display device to display the ATC clearance message in a visually distinguishable manner may comprise signaling the aircraft display device to display the ATC clearance message corresponding to the unique identifier in a display window that is dedicated to displaying the ATC clearance message that relates to the detected cockpit system alert.

The subject matter described herein discloses apparatus, systems, techniques, and articles for associating received ATC clearance messages with cockpit system alerts thereby providing context for the cockpit alerts or advisory messages. In one embodiment, a flight deck system for identifying a cockpit alert context during an aircraft mission is provided. The flight deck system comprises a controller configured to: store message content in a clearance look-up table for one or more clearance messages received from air traffic control (ATC) during the aircraft mission that contain cockpit data about which an avionics system in an aircraft may later sense and generate a cockpit system alert (e.g., cockpit alert or cockpit advisory) for display on a cockpit display device; monitor a plurality of avionics systems in the aircraft for a cockpit system alert; retrieve an ATC clearance message from the clearance look-up table that corresponds to a detected cockpit system alert when a cockpit system alert is detected; and signal an aircraft display device to display the ATC clearance message in a visually distinguishable manner that indicates that the displayed ATC clearance message relates to a detected cockpit system alert.

These aspects and other embodiments may include one or more of the following features. To store message content, the controller may be further configured to identify one or more ATC clearance messages that contain cockpit data, and store message content from the identified one or more ATC clearance messages in the clearance look-up table. To identify one or more ATC clearance messages that contain cockpit data, the controller may be further configured to analyze a plurality of ATC clearance messages, wherein each of the plurality of ATC clearance messages has a unique identifier; retrieve segmented text from the analyzed ATC clearance messages; and identify, from the segmented text for each of the plurality of ATC clearance messages, whether cockpit data is included, a context for included cockpit data, and each sub system within the aircraft that is associated with the cockpit data. To store message content, the controller may be further configured to store, for each of the plurality of ATC clearance messages that has cockpit data, the unique identifier, clearance data, context, and associated sub system for the ATC clearance message in the clearance look-up table, wherein the clearance look-up table maps the clearance data with a cockpit system alert. To retrieve an ATC clearance message from the clearance look-up table, the controller may be further configured to search the clearance look-up table, when a cockpit system alert is detected, for a corresponding ATC clearance message using context and associated sub system information for the cockpit system alert; and identify one or more corresponding ATC clearance messages based on the search. To retrieve an ATC clearance message from the clearance look-up table, the controller may be further configured to identify the unique identifier for a most recent one of the one or more corresponding ATC clearance messages identified based on the search; and retrieve the ATC clearance message corresponding to the unique identifier. To signal the aircraft display device to display the ATC clearance message in a visually distinguishable manner, the controller may be further configured to signal the aircraft display device to display the ATC clearance message corresponding to the unique identifier in a visually distinguishable manner. To signal the aircraft display device to display the ATC clearance message in a visually distinguishable manner, the controller is further configured to signal the aircraft display device to display the ATC clearance message corresponding to the unique identifier in a display window that is dedicated to displaying the ATC clearance message that relates to the detected cockpit system alert.

In another embodiment, a method in a flight deck system for identifying a cockpit alert context during an aircraft mission is provided. The method comprises: storing message content in a clearance look-up table for one or more clearance messages received from air traffic control (ATC) during the aircraft mission that contain cockpit data about which an avionics system in an aircraft may later sense and generate a cockpit system alert (e.g., cockpit alert or cockpit advisory) for display on a cockpit display device; monitoring a plurality of avionics systems in the aircraft for a cockpit system alert; retrieving an ATC clearance message from the clearance look-up table that corresponds to a detected cockpit system alert when a cockpit system alert is detected; and signaling an aircraft display device to display the ATC clearance message in a visually distinguishable manner that indicates that the displayed ATC clearance message relates to a detected cockpit system alert.

These aspects and other embodiments may include one or more of the following features. Storing message content may comprise identifying one or more ATC clearance messages that contain cockpit data; and storing message content from the identified one or more ATC clearance messages in the clearance look-up table. Identifying one or more ATC clearance messages that contain cockpit data may comprise analyzing a plurality of ATC clearance messages, wherein each of the plurality of ATC clearance messages has a unique identifier; retrieving segmented text from the analyzed ATC clearance messages; and identifying, from the segmented text for each of the plurality of ATC clearance messages, whether cockpit data is included, a context for included cockpit data, and each sub system within the aircraft that is associated with the cockpit data. Storing message content may comprise storing, for each of the plurality of ATC clearance messages that has cockpit data, the unique identifier, clearance data, context, and associated sub system for the ATC clearance message in the clearance look-up table, wherein the clearance look-up table maps the clearance data with a cockpit system alert. Retrieving an ATC clearance message from the clearance look-up table may comprise searching the clearance look-up table, when a cockpit system alert is detected, for a corresponding ATC clearance message using context and associated sub system information for the cockpit system alert; and identifying one or more corresponding ATC clearance messages based on the search. Retrieving an ATC clearance message from the clearance look-up table may comprise identifying the unique identifier for a most recent one of the one or more corresponding ATC clearance messages identified based on the search; and retrieving the ATC clearance message corresponding to the unique identifier. Signaling the aircraft display device to display the ATC clearance message in a visually distinguishable manner may comprise signaling the aircraft display device to display the ATC clearance message corresponding to the unique identifier in a visually distinguishable manner Signaling the aircraft display device to display the ATC clearance message in a visually distinguishable manner may comprise signaling the aircraft display device to display the ATC clearance message corresponding to the unique identifier in a display window that is dedicated to displaying the ATC clearance message that relates to the detected cockpit system alert.

In another embodiment, a non-transitory computer readable medium encoded with programming instructions configurable to cause a controller in an aircraft flight deck system to perform a method for identifying a cockpit alert context during an aircraft mission is provided. The method comprises: storing message content in a clearance look-up table for one or more clearance messages received from air traffic control (ATC) during the aircraft mission that contain cockpit data about which an avionics system in an aircraft may later sense and generate a cockpit system alert (e.g., cockpit alert or cockpit advisory) for display on a cockpit display device; monitoring a plurality of avionics systems in the aircraft for a cockpit system alert; retrieving an ATC clearance message from the clearance look-up table that corresponds to a detected cockpit system alert when a cockpit system alert is detected; and signaling an aircraft display device to display the ATC clearance message in a visually distinguishable manner that indicates that the displayed ATC clearance message relates to a detected cockpit system alert.

These aspects and other embodiments may include one or more of the following features. Storing message content may comprise analyzing a plurality of ATC clearance messages, wherein each of the plurality of ATC clearance messages has a unique identifier; retrieving segmented text from the analyzed ATC clearance messages; identifying, from the segmented text for each of the plurality of ATC clearance messages, whether cockpit data is included, a context for included cockpit data, and each sub system within the aircraft that is associated with the cockpit data; and storing, for each of the plurality of ATC clearance messages that has cockpit data, the unique identifier, clearance data, context, and associated sub system for the ATC clearance message in the clearance look-up table, wherein the clearance look-up table maps the clearance data with a cockpit system alert. Retrieving an ATC clearance message from the clearance look-up table may comprise searching the clearance look-up table, when a cockpit system alert is detected, for a corresponding ATC clearance message using context and associated sub system information for the cockpit system alert; identifying one or more corresponding ATC clearance messages based on the search; identifying the unique identifier for a most recent one of the one or more corresponding ATC clearance messages identified based on the search; and retrieving the ATC clearance message corresponding to the unique identifier. Signaling the aircraft display device to display the ATC clearance message in a visually distinguishable manner comprises signaling the aircraft display device to display the ATC clearance message corresponding to the unique identifier in a display window that is dedicated to displaying the ATC clearance message that relates to the detected cockpit system alert.

In another embodiment, a flight deck system for identifying a cockpit alert context is provided. The flight deck system comprises a controller configured to: analyze a plurality of received air traffic control (ATC) clearance messages from ATC, wherein each of the plurality of ATC clearance messages has a unique identifier; retrieve segmented text from the analyzed ATC clearance messages; identify, from the segmented text for each of the plurality of clearance messages, whether cockpit data is included, a context for included cockpit data, and each sub system within the aircraft that is associated with the cockpit data; store, for each of the plurality of ATC clearance messages that has cockpit data, the unique identifier, clearance data, context, and associated sub system for the ATC clearance message in a clearance look-up table, wherein the clearance look-up table maps the clearance data with cockpit system alerts; monitor a plurality of avionics systems in the aircraft for alert and advisory messages; search, when an alert or advisory message is detected, the clearance look-up table for a corresponding ATC clearance message using context and associated sub system information for the alert or advisory message; identify one or more corresponding ATC clearance messages based on the search when data for the one or more corresponding ATC clearance messages have been stored; identify the unique identifier for a most recent one of the one or more corresponding ATC clearance messages identified based on the search; and signal an aircraft display device to display the ATC clearance message corresponding to the unique identifier.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight deck system in an aircraft configured to provide a reason for an alert from a cockpit system during a mission, the flight deck system comprising:
   a storage medium configured for storing a clearance look-up table; and
   a controller configured to:
   receive a plurality of air traffic control (ATC) clearance messages transmitted from ATC during an aircraft mission;
   store, in the storage medium in a the clearance look-up table for each of the plurality of ATC clearance messages, a unique identifier for ATC clearance message, clearance data from the ATC clearance message, context data relating to the ATC clearance message, and an identifier for an associated aircraft subsystem related to the ATC clearance message;
   receive a cockpit system alert from a first aircraft subsystem;
   after the cockpit system alert is received from the first aircraft subsystem, search the clearance look-up table for a corresponding ATC clearance message that provides the reason for the cockpit system alert based on aircraft subsystem identifier data and ATC clearance message context data;
   generate a graphical display for display on a display device in the aircraft comprising a first window that includes a textual depiction of a plurality of ATC clearance messages and a second window that includes a textual depiction of the ATC clearance message that matches the alert and provides the reason for the cockpit system alert;
   display the graphical display comprising the first window and the second window that provides the reason for the cockpit system alert for flight crew viewing on the display device;
   wherein the flight crew is alerted via the second window of the graphical display to the ATC clearance message that matches the cockpit system alert and provides the reason for the cockpit system alert without the flight crew searching through old clearance messages to find the reason for the cockpit system alert; and
   enable execution of a flight operation based on the ATC clearance message that matches the cockpit system alert.

2. The flight deck system of claim 1, wherein the associated aircraft subsystem comprises a flight management system (FMS), a flight control (FC) system, a traffic alert and collision avoidance system (TCAS), a weather (WX) system, a Fuel system, an engine (Eng) system, an electrical (Elec) system, or a hydraulics (Hyd) system.

3. The flight deck system of claim 1, wherein the controller is further configured to store category data for the ATC clearance message in the clearance look-up table.

4. The flight deck system of claim 1, wherein the controller is further configured to:
   monitor a plurality of onboard systems in the aircraft comprising one or more of a flight management system (FMS), a flight control (FC) system, a traffic alert and collision avoidance system (TCAS), a weather (WX) system, a Fuel system, an engine (Eng) system, an electrical (Elec) system, or a hydraulics (Hyd) system for the alert; and monitor page or widget data from various cockpit displays for the alert.

5. The flight deck system of claim 1, wherein to match the alert to a relevant ATC clearance message from the clearance look-up table, the controller is configured to:
  match alert to a plurality of corresponding ATC clearance messages based on context data; and
  select a latest of the plurality of corresponding ATC clearance messages for retrieval.

6. The flight deck system of claim 1, wherein to match the alert to a relevant ATC clearance message from the clearance look-up table, the controller is configured to:
  match the alert to a plurality of corresponding ATC clearance messages based on context data; and
  select a most relevant corresponding ATC clearance messages for retrieval.

7. An aircraft, comprising:
  a display device;
  a COM radio configured to receive air traffic control (ATC) clearance messages from ATC as voice messages;
  a datalink system configured to receive ATC clearance messages as uplink text;
  a plurality of onboard systems in the aircraft capable of generating a cockpit alert or cockpit advisory;
  a transcription system configured to:
  convert speech from the voice messages to text; and
  derive segmented text from the converted text and the uplink text; and
  a controller configured to:
  store, in a clearance look-up table for each of a plurality of ATC clearance messages, a unique identifier for the ATC clearance message, clearance data from the segmented text corresponding to the ATC clearance message, context data relating to the ATC clearance message, and an identifier for an associated aircraft subsystem related to the ATC clearance message;
  receive a cockpit system alert from a first aircraft subsystem;
  after the cockpit system alert is received from the first aircraft subsystem, search the clearance look-up table for a corresponding ATC clearance message that provides a reason for the cockpit system alert based on aircraft subsystem identifier data and ATC clearance message context data;
  generate a graphical display for display on the display device comprising a first window that includes a textual depiction of a plurality of ATC clearance messages and a second window that includes a textual depiction of the ATC clearance message that matches the cockpit system alert and provides the reason for the cockpit system alert;
  display the graphical display comprising the first window and the second window that provides the reason for the cockpit system alert for flight crew viewing on the display device;
  wherein the flight crew is alerted via the second window of the graphical display to the ATC clearance message that matches the cockpit system alert and provides the reason for the cockpit system alert without the flight crew searching through old clearance messages to find the reason for the cockpit system alert; and enable execution of a flight operation based on the ATC clearance message that matches the cockpit system alert.

8. The aircraft of claim 7, wherein the associated aircraft subsystem comprises a flight management system (FMS), a flight control (FC) system, a traffic alert and collision avoidance system (TCAS), a weather (WX) system, a Fuel system, an engine (Eng) system, an electrical (Elec) system, or a hydraulics (Hyd) system.

9. The aircraft of claim 7, wherein the controller is further configured to store category data for each of the plurality of ATC clearance messages in the clearance look-up table.

10. The aircraft of claim 7, wherein the controller is further configured to:
  monitor a plurality of onboard systems in the aircraft comprising one or more of a flight management system (FMS), a flight control (FC) system, a traffic alert and collision avoidance system (TCAS), a weather (WX) system, a Fuel system, an engine (Eng) system, an electrical (Elec) system, or a hydraulics (Hyd) system; and
  monitor page or widget data from various cockpit displays for the cockpit system alert.

11. The aircraft of claim 7, wherein to match the cockpit system alert to a relevant ATC clearance message from the clearance look-up table, the controller is configured to:
  match the cockpit system alert to a plurality of corresponding ATC clearance messages based on context data; and
  select a latest of the plurality of corresponding ATC clearance messages for retrieval.

12. A method in an aircraft, the method comprising:
  providing a storage medium configured for storing a clearance look-up table;
  receiving, by a processor, a plurality of air traffic control (ATC) clearance messages transmitted from ATC during an aircraft mission;
  storing, by the processor in the storage medium in the clearance look-up table for each of the plurality of ATC clearance messages, a unique identifier for the ATC clearance message, clearance data from the ATC clearance message, context data relating to the ATC clearance message, and an identifier for an associated aircraft subsystem related to the ATC clearance message;
  receiving a cockpit system alert from a first aircraft subsystem;
  when the cockpit system alert is received from the first aircraft subsystem, searching the clearance look-up table for a corresponding ATC clearance message that provides a reason for the cockpit system alert based on aircraft subsystem identifier data and ATC clearance message context data;
  generating a graphical display for display on a display device in the aircraft comprising a first window that includes a textual depiction of a plurality of ATC clearance messages, a textual depiction of the plurality of ATC clearance messages and a second window that includes a textual depiction of the ATC clearance message that matches the cockpit system alert and provides the reason for the cockpit system alert;
  displaying the graphical display comprising the first window and the second window that provides the reason for the cockpit system alert for flight crew viewing on the display device;
  wherein the flight crew is alerted via the second window of the graphical display to the ATC clearance message that matches the cockpit system alert and provides the reason for the cockpit system alert without the flight crew searching through old clearance messages to find the reason for the cockpit system alert; and executing a flight operation based on the ATC clearance message that matches the cockpit system alert.

13. The method of claim 12, further comprising:

monitoring a plurality of onboard systems in the aircraft comprising one or more of a flight management system (FMS), a flight control (FC) system, a traffic alert and collision avoidance system (TCAS), a weather (WX) system, a Fuel system, an engine (Eng) system, an electrical (Elec) system, or a hydraulics (Hyd) system for the cockpit system alert; and monitoring page or widget data from various cockpit displays for alerts.

14. The method of claim 12, wherein matching the cockpit system alert to a relevant ATC clearance message from the clearance look-up table comprises:

matching the cockpit system alert to a plurality of corresponding ATC clearance messages based on context data; and selecting a latest corresponding ATC clearance messages for retrieval.

15. The method of claim 12, wherein matching the cockpit system alert to a relevant ATC clearance message from the clearance look-up table comprises:

matching the cockpit system alert to a plurality of corresponding ATC clearance messages based on context data; and selecting a most recent corresponding ATC clearance message of the plurality of corresponding ATC clearance messages for retrieval.

16. The method of claim 12, further comprising storing category data for each of the plurality of ATC clearance messages in the clearance look-up table.

17. The method of claim 12, wherein the associated aircraft subsystem comprises a flight management system (FMS), a flight control (FC) system, a traffic alert and collision avoidance system (TCAS), a weather (WX) system, a Fuel system, an engine (Eng) system, an electrical (Elec) system, or a hydraulics (Hyd) system.

18. The aircraft of claim 7, wherein to match the cockpit system alert to a relevant ATC clearance message from the clearance look-up table, the controller is configured to:

match the cockpit system alert to a plurality of corresponding ATC clearance messages based on context data; and select a most recent relevant corresponding ATC clearance messages for retrieval.

* * * * *